United States Patent [19]

Johnson et al.

[11] 4,439,489

[45] Mar. 27, 1984

[54] PARTICLES COVERED WITH A CURED INFUSIBLE THERMOSET FILM AND PROCESS FOR THEIR PRODUCTION

[75] Inventors: Calvin K. Johnson, Lockport; David R. Armbruster, Forest Park, both of Ill.

[73] Assignee: Acme Resin Corporation, Forest Park, Ill.

[21] Appl. No.: 349,222

[22] Filed: Feb. 16, 1982

[51] Int. Cl.³ .............................................. B32B 27/42
[52] U.S. Cl. .................................... 428/404; 427/221; 427/314; 427/318; 427/385.5; 428/407; 428/446; 428/451; 428/454
[58] Field of Search ...................... 427/221, 385.5, 314, 427/318; 428/404, 407, 446, 454, 451

[56] References Cited

U.S. PATENT DOCUMENTS

| | | | |
|---|---|---|---|
| 3,026,938 | 3/1962 | Huitt et al. | 166/42 |
| 3,929,191 | 12/1975 | Graham et al. | 166/276 |
| 3,962,491 | 6/1976 | Sato et al. | 427/314 |
| 4,175,159 | 11/1979 | Raleigh | 427/221 |
| 4,202,780 | 5/1980 | Brendle | 427/221 |
| 4,290,928 | 9/1981 | Fungbiki et al. | 427/221 |
| 4,310,045 | 1/1982 | Smillie | 427/221 |
| 4,333,743 | 6/1982 | Nojima | 427/221 |

OTHER PUBLICATIONS

*Condensed Chemical Dictionary*, 6th Ed., Rheinhold Pub., N.Y., pp. 870, 871 and 1019.

*Primary Examiner*—Michael R. Lusignan
*Assistant Examiner*—Janyce A. Bell
*Attorney, Agent, or Firm*—Stanley M. Parmerter

[57] ABSTRACT

An improved process is provided for preparing a product containing particles individually coated with a cured, thermoset phenolic resin. The process comprises mixing particulate matter with an uncured resin and a lubricant at a temperature which causes curing of the resin. The product obtained by this process shows superior properties as a propping agent for treating subterranean formations.

22 Claims, No Drawings

PARTICLES COVERED WITH A CURED INFUSIBLE THERMOSET FILM AND PROCESS FOR THEIR PRODUCTION

FIELD OF THE INVENTION

This invention relates to an improved process for coating particulate matter with cured, thermoset phenolic resins and to the products, prepared by this process, which are useful as propping agents for propping fractures in subterranean formations.

BACKGROUND OF THE INVENTION

Fracturing is widely used to increase the productivity of oil and gas wells. This is generally accomplished by forcing liquids into the well under pressure to open cracks in the formations surrounding the well. Various solid materials are then introduced to prop open the fractures that are formed.

Sand is frequently used as a propping agent in such applications. It is relatively inexpensive, and when suspended in liquids it is readily carried into the fractures. However, if the well is deep, the high pressures encountered crush some of the sand giving finely-divided particles which tend to plug the fracture. For this reason, alternate propping agents have been sought for use in deep wells.

One propping agent recently found to be suitable for use in deep wells is sintered bauxite. Although this material is able to withstand the high pressures developed in the wells, it is comparatively expensive and it can undergo attrition by chemical action in some applications. Consequently, less costly substances have been sought. In particular, many workers have attempted to treat sand and other solid particles to enable them to withstand the high pressures found in deep wells.

One method for treating proppant sand is that disclosed in U.S. Pat. No. 3,026,938. According to this process, sand particles are coated with a flexible material such as rubber latex. The resulting particles are compressed and not broken when subjected to high pressure in the fracture. However, this material has found limited use in formations subjected to high pressure because this proppant fails to maintain good permeability when compressed.

Another type of coated sand is disclosed in U.S. Pat. No. 3,929,191. According to this disclosure, sand is coated with an uncured, thermoplastic resin which first melts and then cures in the fracture. Such a process causes the sand grains to be bound together preventing their movement out of the fracture. However, for these products to be satisfactory, curing must be carefully controlled. If the coating cures too rapidly, it may cause plugging of the well bore or aggregation of the sand before it reaches the extremities of the fracture. If the coating cures too slowly, the well has to be held under pressure until the curing is completed.

A process for making a propping agent coated with a cured epoxy resin is disclosed in U.S. Pat. No. 3,935,339. According to this process, a mixture of solid particles, uncured epoxy resin, a surfactant, and a heated liquid in which the resin is insoluble is agitated until the coating cures. The coated solid is then separated from the liquid.

A similar process for obtaining a propping agent coated with a cured furan resin is disclosed in U.S. Pat. No. 3,492,147. According to this process, particulate matter, coated with furfuryl alcohol or uncured furfuryl alcohol resin, is stirred in heated oil containing an acid catalyst to give individual particles coated with an infusible resin. An alternate process which involves mixing the solid with an uncured resin solution and an acid catalyst solution in a continuous ribbon blender and continuously routing the mixture into a heated chamber is also mentioned.

The present invention is directed to a method for the preparation of particulate matter uniformly coated with a cured phenolic resin which does not require the expensive process of curing the product in an inert solvent. By this process, the particles are readily coated with a cured resin without the formation of large amounts of agglomerated material.

The products of this invention are resistant to crushing when subjected to high pressures, giving proppants of high permeability. Their coating makes them resistant to attack by acids and steam, materials often used in treating wells. Finally, their lubricated coating is resistant to abrasion reducing the formation of dust which could cause plugging of well openings. Such properties make these products useful not only in hydraulic fracturing but also in gravel pack completions and other applications as well.

SUMMARY OF THE INVENTION

In accordance with this invention, there is provided a process for the preparation of particulate matter coated with a cured phenolic resin wherein the improvement comprises mixing an uncured resin with the particulate matter at a temperature of from about 300° F. to about 450° F., adding with continued mixing from about 0.03% to about 0.5% by weight, based on the weight of the particulate matter, of a lubricant to the mix of resin and particulate matter and maintaining the resultant mixture above about 300° F. for a sufficient time to cure the resin, whereby there is obtained a product containing individually coated particles having high abrasion resistance and improved crush resistance suitable for use as a propping agent in subterranean formations.

Additionally, in accordance with this invention, there is provided coated particulate matter consisting essentially of particles individually coated with a cured phenolic resin prepared by mixing an uncured resin with the particulate matter at a temperature of from about 300° F. to about 450° F., adding with continued mixing from about 0.03% to about 0.5% by weight, based on the weight of the particulate matter, of a lubricant to the mix of resin and particulate matter and maintaining the resultant mixture above about 300° F. for a sufficient time to cure the resin.

DETAILED DESCRIPTION OF THE INVENTION

The particulate matter used in the practice of this invention can be any of the solid materials normally used as propping agents. Such materials include sand, sintered bauxite, zircon and glass beads. The material should be resistant to melting or decomposition at temperatures below about 450° F. The particles are preferably of a relatively uniform size. Particle sizes commonly employed vary between 10 and 100 mesh (U.S. Standard Screen sizes). Sands which conform with the American Petroleum Institute specifications for fracturing sands are particularly useful.

The phenolic resins used in the practice of this invention can be either novolak or resole resins. When a resole resin is used, the thermosetting resin cures on the particulate matter merely by heating. When a novolak resin is used, it is necessary to add a curing agent such as hexamethylenetetramine to the resin in order to obtain a coating of cured resin on the particulate matter. The novolak and resole resins used for the process of this invention can be prepared from any of the well-known phenols and aldehydes used to make such resins. The phenolics made from unsubstituted phenol and formaldehyde are quite satisfactory.

According to the process of this invention, the particulate matter is first heated to a temperature of from about 300° F. to about 450° F., preferably from about 350° F. to about 400° F. To the hot particles in a mixer or muller is added an uncured phenolic resin. The phenolic resin can be in solid or liquid form. When the resin is in liquid form, it is usually a solution in water or other solvent well known in the phenolic resin art. Sufficient resin is added to completely coat the particles. For this purpose, from about 1.5% to about 8%, preferably from about 3% to about 5%, of the resin, based on the weight of the particles, is added. The hot particles and resin form a dough-like mix.

If the phenolic resin used in the process is a novolak resin, a curing agent is added to the mix. A useful curing agent for this purpose is hexamethylenetetramine which can be added as either a solid or a solution. If it is added in a solid form, the solid must be finely divided to insure adequate mixing with the other components. The amount of hexamethylenetetramine added is from about 8% to about 20%, preferably from about 12% to about 18% by weight of the resin on a dry solids basis.

An important step in the present invention is the addition of a small amount of lubricant to the hot mix of resin and particulate matter while it is still mixing. The amount of lubricant employed can vary from about 0.03% to about 0.5% by weight based on the weight of the particulate matter. This lubricant is preferably added to the dough-like mixture before it breaks up into free-flowing particles. It has been found that the addition of such a lubricant reduces abrasion and prevents dust formation when the material is mixed at high temperatures. Surprisingly, it also can increase the resistance of the product to crushing and reduces agglomeration of the coated particles.

The lubricant used in the process of this invention is one that is liquid at the temperatures used in the mixer. It should have a sufficiently high boiling point so that it is not lost from the mixer during the heating process. Suitable lubricants include liquid silicone such as Dow-Corning Silicone 200, mineral oil, paraffin wax, petrolatum or the synthetic lubricant Acrawax CT, a bis-stearamide of a diamine, available from Glyco Chemicals Inc., Greenwich, Conn.

The most preferred lubricant is a liquid silicone. It is preferably added before the dough-like mixture breaks up into free-flowing particles. When silicone is added in this fashion, it not only reduces agglomeration of the particles but also gives particles with greater resistance to crushing than those formed if no such liquid is added.

The mixture of particulate matter, resin and lubricant is mixed at a temperature above about 300° F. until the resin is sufficiently cured and the mass has broken up into free-flowing particles. The length of time the material is maintained above 300° F. will vary somewhat with the curing properties of the resin employed.

After the cure of the resin is essentially complete, the mixture can be passed through a screen to remove agglomerated particles. If desired, the product can be subjected to further heating in order to insure complete cure of the resin. The product comprises individual particles coated with a thin layer of a cured phenolic resin. The coating is hard and does not melt or compress appreciably when subjected to temperatures and pressures found in deep wells.

The following examples illustrate the invention. It is to be understood that the examples are illustrative only and are not intended to limit the invention in any way. In the examples, all parts are percentages by weight unless otherwise indicated and all screen mesh sizes are U.S. Standard Screen sizes.

EXAMPLE 1

In a 3-quart mixing bowl was placed 1 kg of 20/40-mesh Bellrose Silica Sand (obtained from the Bellrose Silica Company of Ottawa, Ill.) preheated to 460° F. The sand was stirred with a Hobart C-100 Mixer (made by the Hobart Manufacturing Company, Troy, Ohio) until the temperature dropped to 400° F. Then 40 g of a novolak flake resin, prepared by heating 1000 parts of phenol, 506 parts of 50% formalin and 6.7 parts of oxalic acid followed by dehydrating at 300° F., was added and mixing was continued for 45 seconds before 4.8 g of powdered hexamethylenetetramine was added. After 70 seconds of mixing time, a lubricant was added and after about 100 seconds, the mix became free-flowing. Mixing was continued for a total of 380 seconds, at which time the sand temperature was checked. The sand was then dumped onto a No. 16-mesh screen to determine the amount of agglomerates larger than this mesh size. Such agglomerates contain 2 or more grains of sand bound together. The material passing through the screen consisted of separate, individually-coated sand particles. These were tested for crush resistance by the American Petroleum Institute recommended test. In this procedure, 40 grams of sand is placed in a 2-inch cylinder die test cell. Four thousand psi of pressure is applied to the die over a period of 1 minute. This pressure is then held for 2 minutes before the sand is removed and screened through an appropriate screen to remove any crushed sand grains. The crushed sand that passes through the screen is weighed to determine the percent of sand crushed. The results of tests performed on sands coated using three different lubricants and a control in which no lubricant was added are given in Table I.

TABLE I

| Sand Mix | Sand Temperature at 380 Seconds (°F.) | % Agglomeration >#16 Mesh | % Crushed 4000 psi |
|---|---|---|---|
| Coated Control (no lubricant) | 265 | 13.5 | 0.38 |
| Silicone Liquid[a] | 262 | 9.0 | 0.26 |
| Acrawax CT[b] | 261 | 17.5 | 0.23 |
| Mineral Oil | 264 | 9.9 | 0.33 |
| Uncoated Control | — | — | 4.07 |

[a]Silicone 200, available from the Dow-Corning Corporation, Midland, Michigan.
[b]A bis-stearamide of a diamine, available from Glyco Chemicals Inc., Greenwich, Connecticut.

The results from Example 1 show that when a novolak resin coated on a preheated sand is being cured, the addition of a silicone lubricant, before the mixture breaks up to become free-flowing, provides a resin-coated sand with superior crush resistance. There is also much less agglomeration than is observed when no lubricant is present. Example 1 further shows that the solid synthetic lubricant (Acrawax CT), when added to the resin-coated sand in the process of curing, likewise gives a resin-coated sand with improved crush resistance over that produced without the use of such a lubricant. However, this additive does not prevent agglomeration. Finally, Example 1 also shows that the use of mineral oil as a lubricant added during the curing of a sand coated with a phenolic resin prevents agglomeration of the coated sand particles but imparts less additional crush resistance over that obtained with the coated sand to which no lubricant has been added.

EXAMPLE 2

The procedure of Example 1 was repeated except that the resin used was No. 1101 CNW Flake Resin, a solid phenolic novolak resin available from the Acme Resin Corporation, Forest Park, Ill. In this case, 5.6 g of powdered hexamethylenetetramine was added after 60 seconds of mixing. At about 90 seconds of total mixing, the mix had broken into free-flowing particles. At this time, a lubricant, was added and mixing was continued for a total of 300 seconds before the sand was collected and tested. The results of tests on sands prepared by this procedure is given in Table II.

TABLE II

| Sand Mix | Sand Temperature at 300 Seconds (°F.) | % Agglomeration >#16 Mesh | % Crushed 4000 psi |
|---|---|---|---|
| Coated Control (no lubricant) | 302 | 20.3 | 0.47 |
| Silicone Liquid[a] | 303 | 20.2 | 0.33 |
| Acrawax CT[b] | 298 | 19.4 | 0.30 |
| Mineral Oil | 296 | 20.3 | 0.28 |
| Paraffin Wax | 298 | 19.8 | 0.26 |
| Petrolatum[c] | 299 | 20.4 | 0.31 |
| Uncoated Control | — | — | 4.07 |

[a]Silicone 200, available from the Dow-Corning Corporation, Midland, Michigan.
[b]A bis-stearamide of a diamine, available from Glyco Chemicals Inc., Greenwich, Connecticut.
[c]An industrial grade of petrolatum, Penreco Red, available from Penreco, a division of Pennzoil, Butler, Pennsylvania, was used.

Example 2 shows that a wide number of lubricants can be added to a phenolic resin-sand mixture during the curing of the resin to improve the crush resistance of the resin-coated sand. However, when these lubricants are added after the hot resin-coated mixture has broken up and become free-flowing, they do little to prevent the agglomeration of the resin-coated sand particles. The combined results of Examples 1 and 2 indicate that the best process to give a product with low agglomeration and good crush resistance involves addition of a silicone liquid to the hot phenolic resin-sand mix before the mix breaks up into free-flowing particles.

EXAMPLE 3

The procedure of Example 1 was followed except that 63.5 g of a 60% solution in methanol of BRPE No. 4035 Resin (a resole resin available from the Union Carbide Corporation) and 2 g of Acrawax CT Lubricant was added to the sand at 430° F. and mixed for 35 seconds. 92.3% of the product passed through a No. 16-mesh screen and only 0.47% of the sand was crushed when the standard fracturing sand crush resistance test at 4000 psi was run. This compared with the 4.07% of uncoated sand that was crushed in the same test. This example demonstrates that a phenolic resole resin, as well as a phenolic novolak resin, can be used to prepare cured resin-coated sands according to the process of this invention.

EXAMPLE 4

The genral procedure of Example 1 was followed except that 40 g of No. 1129 Flake Resin (a solid phenolic novolak resin available from the Acme Resin Corporation, Forest Park, Ill.) was added to 1 kg of 20/40-mesh Bellrose Silica Sand at 422° F. After 60 seconds of mixing, 14 ml of an aqueous solution containing 32.7% hexamethylenetetramine was added. After 85 seconds of mixing, 3 g of Dow-Corning 200 Silicone Fluid was added. After 200 seconds of mixing, the sand temperature was 316° F. After 320 seconds of mixing, 15 ml of water was added to cool the sand, and at 350 seconds, the sand temperature was 221° F. At this time, mixing was stopped and the free-flowing sand was screened through a No. 16-mesh screen. 92.3% of the material passed through the screen. In the standard crush resistance test, only 0.25% of the coated sand was crushed at 4000 psi. In contrast, 4.07% of the starting sand was crushed in the same test.

EXAMPLE 5

In a preheated Beardsley and Piper Speedmuller, No. 5060 HP, available from the Beardsley and Piper Division of Pettibone Corporation, Chicago, Ill., was placed 1000 lb of 20/40-mesh Badger Mining Silica Sand (available from the Badger Mining Corporation, Fairwater, Wis.) preheated to 405° F. To this was added 40 lb of No. 1101 CNW Flake Resin. After 30 seconds, 6.4 lb of powdered hexamethylenetetramine was added with continued mulling. After 80 seconds of mull time, 1 lb of Dow-Corning 200 Silicone Fluid was added and mulling was continued for 330 seconds. The cured coated sand was passed through a No. 16-mesh screen and cooled. Crush resistance of this coated sand was measured by the standard procedure except that a pressure of 16,000 psi was used. Under these conditions, 4.1% of the coated sand was crushed, whereas 36.0% of the uncoated sand was crushed. This example shows that the general procedure of this invention can be scaled up satisfactorily.

Thus, it is apparent that there has been provided, in accordance with the invention, particles individually coated with a cured, thermoset phenolic resin and a process for their production that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. A process for the preparation of particulate matter coated with a cured phenolic resin wherein the improvement comprises mixing an uncured resin with particulate matter resistant to melting or decomposition at temperatures below about 450° F., preheated to a temperature of from about 300° F. to about 450° F., adding with continued mixing from about 0.03% to about 0.5% by weight, based on the weight of the particulate matter, of a lubricant to the mix of resin and particulate matter and maintaining the resultant mixture above about 300° F. for a sufficient time to cure the resin, whereby there is obtained a product containing individually coated particles having high abrasion resistance and improved crush resistance suitable for use as a propping agent in subterranean formations.

2. The process of claim 1 wherein the particulate material is sand.

3. The process of claim 1 wherein the phenolic resin is a resole resin.

4. The process of claim 1 wherein the phenolic resin is a novolak resin and a curing agent is added.

5. The process of claim 4 wherein the curing agent is hexamethylenetetramine.

6. The process of claim 1 wherein the lubricant is a silicone liquid.

7. The process of claim 6 wherein the silicone liquid is added to the mix of resin and particulate matter before said mix breaks up into free-flowing particles.

8. The process of claim 1 wherein the lubricant is mineral oil.

9. The process of claim 8 wherein the mineral oil is added to the mix of resin and particulate matter before said mix breaks up into free-flowing particles.

10. The process of claim 1 wherein the lubricant is a bis-stearonide of a diomine.

11. The process of claim 5 wherein the uncured resin is mixed with the particulate matter at a temperature of from about 350° F. to about 400° F.

12. Coated particulate matter consisting essentially of particles individually coated with a cured phenolic resin prepared by mixing an uncured resin with particulate matter resistant to melting or decomposition at temperatures below about 450° F., preheated to a temperature of from about 300° F. to about 450° F., adding with continued mixing from about 0.03% to about 0.5% by weight, based on the weight of the particulate matter, of a lubricant to the mix of resin and particulate matter and maintaining the resultant mixture above about 300° F. for a sufficient time to cure the resin.

13. The coated particulate matter of claim 12 wherein the particulate matter is sand.

14. The coated particulate matter of claim 12 wherein the phenolic resin is a resole resin.

15. The coated particulate matter of claim 12 wherein the phenolic resin is a novolak resin and a curing agent is added.

16. The coated particulate matter of claim 15 wherein the curing agent is hexamethylenetetramine.

17. The coated particulate matter of claim 12 wherein the lubricant is a silicone liquid.

18. The coated particulate matter of claim 17 wherein the silicone liquid is added to the mix of resin and particulate matter before said mix breaks up into free-flowing particles.

19. The coated particulate matter of claim 12 wherein the lubricant is mineral oil.

20. The coated particulate matter of claim 19 wherein the mineral oil is added to the mix of resin and particulate matter before said mix breaks up into free-flowing particles.

21. The coated particulate matter of claim 12 wherein the lubricant is a bis-stearamide of a diomine.

22. The coated particulate matter of claim 16 wherein the uncured resin is mixed with the particulate matter at a temperature of from about 350° F. to about 400° F.

* * * * *